United States Patent
Bae et al.

(10) Patent No.: US 7,414,767 B2
(45) Date of Patent: Aug. 19, 2008

(54) SEMICONDUCTOR OPTICAL DEVICE AND SEMICONDUCTOR OPTICAL PACKAGE USING THE SAME

(75) Inventors: Yu-Dong Bae, Suwon-si (KR); Byung-Kwon Kang, Suwon-si (KR)

(73) Assignee: Samsung Electronics Co., Ltd., Maetan-Dong, Yeongtong-Gu, Suwon-Si, Gyeonggi-Do (KR)

( * ) Notice: Subject to any disclaimer, the term of this patent is extended or adjusted under 35 U.S.C. 154(b) by 579 days.

(21) Appl. No.: 10/896,343

(22) Filed: Jul. 21, 2004

(65) Prior Publication Data

US 2005/0158058 A1 Jul. 21, 2005

(30) Foreign Application Priority Data

Jan. 15, 2004 (KR) .................... 10-2004-0003063

(51) Int. Cl.
*G02B 1/03* (2006.01)

(52) U.S. Cl. .................... 359/241; 359/238; 257/449

(58) Field of Classification Search ................ 359/241, 359/238, 245, 248, 254; 257/449, 453, 481; 385/14; 438/27
See application file for complete search history.

(56) References Cited

U.S. PATENT DOCUMENTS 5,274,246 A * 12/1993 Hopkins et al. .............. 257/17

2005/0175274 A1 * 8/2005 Gunn .......................... 385/16

FOREIGN PATENT DOCUMENTS

| JP | 06-112595 | 4/1994 |
| JP | 2002-232079 | 8/2002 |
| JP | 2002-368325 | 12/2002 |
| JP | 2003-046179 | 2/2003 |
| JP | 2004-126108 | 4/2004 |

OTHER PUBLICATIONS

Kotaka, Isamu; et al.; "High-Speed (20Gbit/s) Low-Drive-Voltage ($2V_{P-P}$) Strained-InGaAsP MQW Modulator/DFB Laser Light Source;" May 1994; vol. J77-C-1, No. 5.

* cited by examiner

*Primary Examiner*—Timothy Thompson
(74) *Attorney, Agent, or Firm*—Cha & Reiter, LLC

(57) ABSTRACT

A semiconductor optical device, which includes a semiconductor substrate, an electro-absorption modulator, and at least one optical device is monolithically integrated on the semiconductor substrate. An insulative layer surrounds the electro-absorption modulator and the optical devices on the semiconductor substrate, at least two metallic pads, one of which being an electrode of the modulator, are formed at a distance from each other on the insulative layer. A plurality of metallic wires are adapted for electrically connecting the electro-absorption modulator to the metallic pads and adjusting a value of inductance of the electro-absorption modulator. The metallic wires are formed on the insulative layer. A dielectric layer formed under the insulative layer provides a minimizing of parasitic capacitance generated in the metallic pads and the metallic wires by being formed under the metallic pads and the metallic wires.

9 Claims, 8 Drawing Sheets

US 7,414,767 B2

SEMICONDUCTOR OPTICAL DEVICE AND SEMICONDUCTOR OPTICAL PACKAGE USING THE SAME

CLAIM OF PRIORITY

This application claims priority to an application entitled "Semiconductor Optical Device and Semiconductor Optical Package Using the Same," filed in the Korean Intellectual Property Office on Jan. 15, 2004 and assigned Ser. No. 2004-3063, the contents of which are hereby incorporated by reference.

BACKGROUND OF THE INVENTION

1. Field of the Invention

The present invention relates to a semiconductor optical device. More particularly, the present invention relates to a semiconductor optical device in which a plurality of optical devices integrated on a semiconductor substrate are electrically connected to each other by wire bonding.

2. Description of the Related Art

An electro-absorption modulator laser (EML) is a type of semiconductor optical device in which a laser generates oscillating light of a predetermined wavelength onto a semiconductor substrate, and in which an electro-absorption modulator for modulating the light oscillated by the laser are monolithically integrated through a semiconductor manufacturing process.

Several documents, including U.S. Pat. No. 6,057,954, which is filed on Sep. 18, 1998 by Parayanthal et al. and is entitled "Asymmetric Inductive Peaking for Optoelectronic Devices", is hereby incorporated by reference as background material, and discloses in detail a semiconductor optical package structure in which the electro-absorption modulation laser and driving circuits for the electro-absorption modulation laser are electrically connected by wire bonding.

FIG. 1 illustrates a configuration of a conventional semiconductor optical package 100 including an electro-absorption modulation laser. The conventional semiconductor optical package comprises a semiconductor optical device 110, a submount 101 on an upper surface of which the semiconductor optical device 110 et al. are securely mounted, a driving circuit 106 that drives a semiconductor optical source (not shown), the driving circuit being positioned on one side of the submount 101, a signal line 103, an electrode 105 connected to a resistor 104, and respective first, second and third wires 120, 130, 140.

The semiconductor optical device 110 includes a semiconductor substrate 113, a semiconductor optical source (not shown) monolithically integrated on the semiconductor substrate 113, an optical modulator (not shown) and the like. The optical source for the semiconductor may include one of a distributed feedback semiconductor laser, etc.

The optical modulator may use an electro-absorption modulator for modulating an output of light generated by the semiconductor optical source or the like, and includes a first upper electrode 111 electrically connected to the signal line 103 and the resistor part 104. A common electrode 102 is formed between the semiconductor optical device 110 and the submount 101 to provide a common ground to the semiconductor optical source and the optical modulator, respectively.

A second upper electrode 112 is attached to an upper surface of the semiconductor optical source, and is electrically connected to the driving circuit 106 by the third wire 140.

The optical modulator may use an electro-absorption modulator for modulating light generated by the semiconductor optical source into an electrical signal or the like. A bandwidth characteristic of light that is modulated by the electro-absorption modulator significantly varies with capacitance, resistance and inductance of the electro-absorption modulator. Only when capacitance (<0.4 pf) and resistance of the electro-absorption modulator is negligibly small, does the bandwidth characteristic of light output from the semiconductor optical package not change considerably.

However, it is not possible to obtain the same values of capacitance (such as 4 pf) and a same amount of negligible resistance for every product in the manufacturing process of a semiconductor optical package including an electro-absorption modulation laser. As a result of this inability to produce products with nearly uniform amounts of capacitance and resistance, optimal lengths of wires for connecting the electro-absorption modulation laser to the driving circuits thus vary according to the individual differences in capacitance, resistance of each product.

In an effort to circumvent the aforementioned problem, the conventional semiconductor optical package minimally maintains a length of the first wire (up to 0.3 mm; up to 0.5 nH) connecting the first upper electrode of the electro-absorption modulator to the signal line on the submount, and sets a relatively longer length of the second wire (1 to 2 mm) connecting the first upper electrode to a matching resistor on the submount. That is, the conventional semiconductor optical package can enhance a transmission characteristic of light and minimize loss by inducing an artificial peaking phenomenon in the electro-absorption modulator caused by using wires having specific lengths and/or inductances.

Consequently, the conventional semiconductor optical package improves the transmission characteristic of laser modulated light by increasing the length of the wire connecting the first upper electrode 111 to the matching resistor on the submount.

FIG. 2 shows an equivalent circuit illustrating inductance of the second wire 130 connected by wire bonding to the electro-absorption modulator of the semiconductor optical device 110 constituting the semiconductor optical package in FIG. 1, and FIGS. 3 to 6 are graphs showing bandwidth changes of light outputs according to inductance changes of the equivalent circuit in FIG. 2. Referring to FIG. 2, "$L_1$" and "$L_2$" shown in the equivalent circuit of the semiconductor optical package refer to the first wire 120 and the second wire 130, respectively, and "Cmod" and "Rs" refer to values of capacitance and series resistance of the electro-absorption modulator, respectively. Also, "$R_L$" refers to resistance of the resistor part, and "Vs" and "$R_1$" designate a high frequency voltage supply source and resistance of an electrical signal generator (not shown), respectively.

Transmission and bandwidth characteristics of light modulated by the electro-absorption modulator vary according to the individual capacitances and resistances of a specific electro-absorption modulator, and according to lengths and conductive properties of the first and second wires 120, 130 connected to the electro-absorption modulator by wire bonding. If the electro-absorption modulator has small values of capacitance (<0.4 pf) and resistance, the bandwidth characteristic does not vary with the change in length of the second wire 130. In actual production of electro-absorption modulator products, however, each individual modulator has slight variations in values of capacitance and/or resistance that normally occur according to slight changes in production conditions. To give a more optimized example, a length of the first wire 120 connecting the first upper electrode 111 of the electro-absorption modulator to the signal line 103 is set as 0.3 mm or less (inductance: 0.5 nH or less), and length of the second wire is set as 1 to 2 mm relatively longer than that of the first wire 120. In other words, the transmission characteristic of a modulated optical signal is improved and potential return loss is minimized by generating an artificial peaking in the electro-absorption modulator. The artificial peaking can be defined as a phenomenon in which a frequency or eye pattern characteristic of transmitted light exceeds a specific upper limit, and such a peaking phenomenon occurs when a length of the second wire 130 is excessively lengthened during the wire bonding of the second wire 130.

FIG. 3 illustrates a bandwidth characteristic of light modulated by the electro-absorption modulator when values of capacitance and resistance of the electro-absorption modulator are 0.7 pf and 10 Ω, respectively. FIG. 4 illustrates a bandwidth characteristic of light modulated by the electro-absorption modulator when values of capacitance and resistance of the electro-absorption modulator are 0.4 pf and 10 Ω, respectively. FIG. 5 illustrates a bandwidth characteristic of light modulated by the electro-absorption modulator when values of capacitance and resistance of the electro-absorption modulator are 0.7 pf and 15 Ω, respectively. FIG. 6 illustrates a bandwidth characteristic of light modulated by the electro-absorption modulator when values of capacitance and resistance of the electro-absorption modulator are 0.4 pf and 15 Ω, respectively.

As length of the second wire 130 is increased, the size of the submount is larger, resulting in a problem of necessitating an increase in the size of the semiconductor optical package. Also, due to the fact that the respective electro-absorption modulators have slight variations in value of capacitance or resistance according to the production conditions in practical production of electro-absorption modulator products, it is difficult to adjust a length of the second wire according to properties of each actual individual product.

SUMMARY OF THE INVENTION

Accordingly, the present invention has been made in part to solve at least some of the aforementioned problems occurring in the prior art. The present invention provides a semiconductor optical device, which can be applied to a miniaturized configuration of a semiconductor optical package and can simultaneously generate light having an excellent transmission characteristic.

One way of accomplishing the above aspect of the invention, can be provided by a semiconductor optical device having a semiconductor substrate; an electro-absorption modulator and at least one optical device being monolithically integrated on the semiconductor substrate; an insulative layer surrounding the electro-absorption modulator and the optical devices on the semiconductor substrate; at least two metallic pads, one of which being an electrode of the modulator, that are formed at a distance from each other on the insulative layer, metallic wires for electrically connecting the electro-absorption modulator to the metallic pads and adjusting inductance change of the electro-absorption modulator, the metallic wires being formed on the insulative layer; and a dielectric layer for minimizing parasitic capacitance generated in the metallic pads and the metallic wires by being formed under the metallic pads and the metallic wires within the insulative layer.

BRIEF DESCRIPTION OF THE DRAWINGS

The above and many other aspects and advantages of the present invention will become more apparent from the following detailed description taken in conjunction with the accompanying drawings, in which.

DETAILED DESCRIPTION

Hereinafter, aspects of the present invention will be described with reference to the accompanying drawings. For the purposes of clarity and simplicity, a detailed description of known functions and configuration incorporated herein will be omitted as it may make the subject matter of the present invention unclear.

Figure 7:
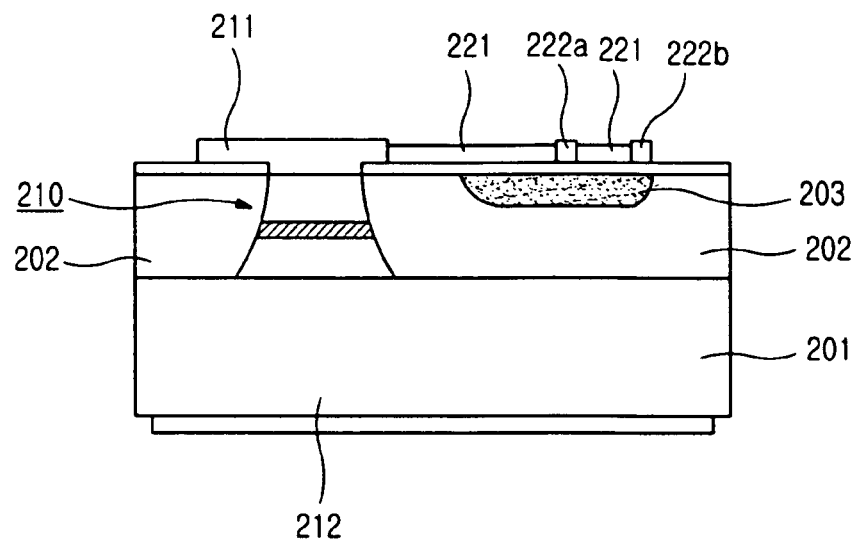
FIG. 7 is a sectional view showing a configuration of a semiconductor optical device in accordance with one aspect of the present invention.
Figure 8A:
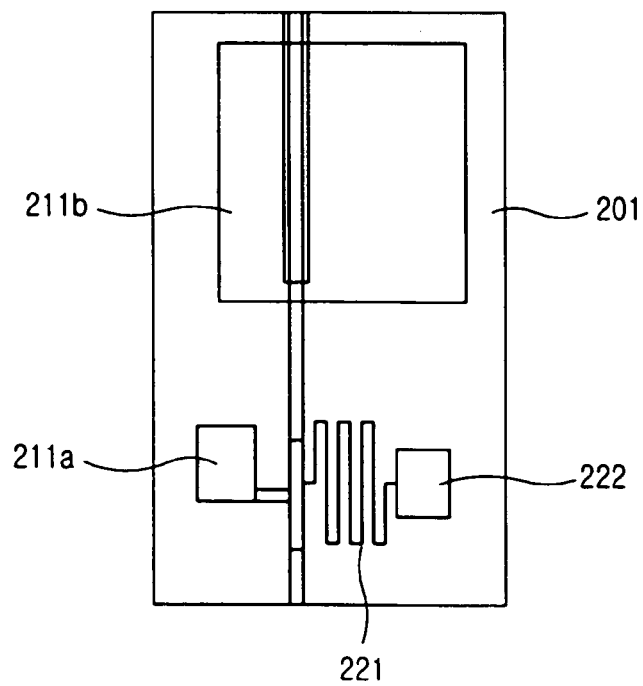
FIGS. 8a to 8c are plan views showing various configurations of the semiconductor optical device in FIG. 7.
Figure 8B:
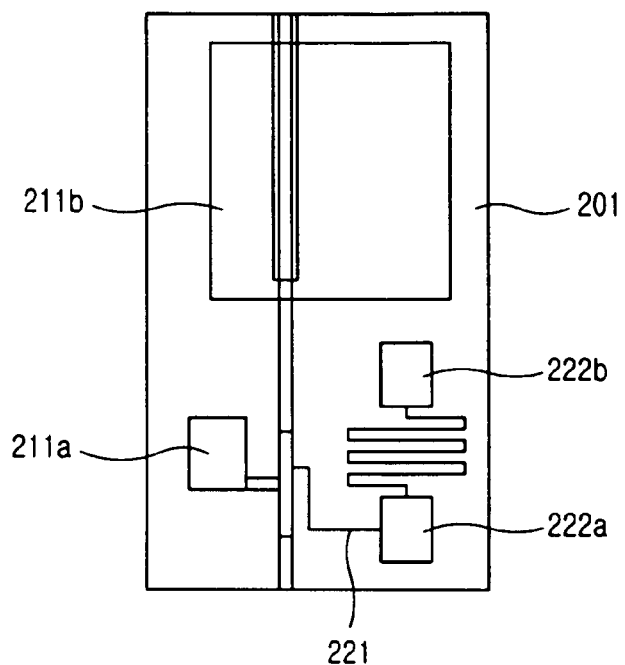
Figure 8C:
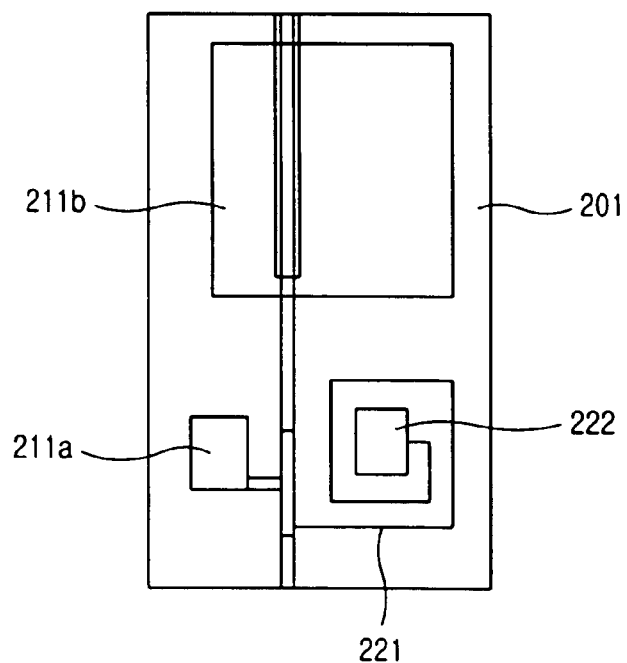

FIG. 7 provides a sectional view showing a configuration of a semiconductor optical device in accordance with a first aspect of the present invention, and FIGS. 8a to 8c provide plan views showing various configurations of the semiconductor optical device in FIG. 7. Referring to FIGS. 7 and 8a to 8c, the semiconductor optical device in accordance with this aspect of the present invention includes a semiconductor substrate 201, an electro-absorption modulator (not shown) and at least one optical device (not shown) monolithically integrated on the semiconductor substrate 201, at least two metallic pads 222, metallic wires 221, and a dielectric layer 203 for minimizing parasitic capacitance.

Waveguides 210 are provided for performing functions of the optical devices, and the electro-absorption modulator and so forth are grown on the semiconductor substrate 201 by a selective area growth (SAG) method or a butt-joint method so as to have mesa structures, and an insulative layer 202 is grown around the optical devices and the electro-absorption modulator.

The electro-absorption modulator is a device for modulating light generated from the optical device, such as the optical source, by changing optical absorbance according to an applied voltage, and includes a first upper electrode 211a for applying an electrical signal and a driving voltage, which is formed on its upper surface.

Optical sources, such as a semiconductor laser, a semiconductor optical amplifier and the like, which generate light of a predetermined wavelength, as well as a waveguide-type optical detector for monitoring intensities of light generated by the optical sources, etc. are monolithically integrated as the above-mentioned optical device. Also, an upper surface of the optical device is formed with a second upper electrode 211b for applying a driving electric current.

In transmitting an optical signal modulated by the electro-absorption modulator, a bandwidth characteristic varies with respect to values of inductance corresponding in part to lengths and conductive properties of the wires connected to the electro-absorption modulator by wire bonding, as well as with respect to values of capacitance and resistance of the electro-absorption modulator itself.

Whereas the bandwidth characteristic of a conventional semiconductor optical device varies with a value of inductance, and the value of inductance can be adjusted according to the lengths of the wires connected to the electro-absorption modulator, this adjustment to the lengths of the wires increases a volume of the semiconductor optical device, thus increasing an overall volume of a semiconductor optical package including the semiconductor optical device. Also, this adjustment causes a problem in that frequency and eye pattern characteristics are deteriorated because a uniform length is applied to the wires regardless of different capacitance and resistance of the electro-absorption modulator according to products or lots.

On the contrary, the present invention uses shortened lengths of the wires and provides the metallic pads and the metallic wires for selectively securing suitable inductance according to the respective lots so as to give an optimal transmission characteristic when the electro-absorption modulators have different capacitance and resistance.

Referring to FIG. 8a, the metallic pad 222 is electrically connected to the first upper electrode 211a by the metallic wire 221. The metallic pad 222 may be also connected to the first upper electrode 211a by the metallic wire 221, as also shown in FIG. 8c. Referring to FIG. 8b, the metallic pads 222a, 222b are formed at a distance from each other on the insulative layer 202, and the metallic wires 221 for electrically connecting the metallic pads 222 to the first upper electrode 211a of the electro-absorption modulator are formed on the insulative layer 202 so as to adjust the amount of inductance of the electro-absorption modulator.

The dielectric layer 203 is formed under the metallic pads 222 and the metallic wires 221 formed within the insulative layer 202, thereby minimizing parasitic capacitance generated in the metallic pads 222 and the metallic wires 221 on it. The dielectric layer 203 may be formed in part by benzocyclobutene (BCB), silicon nitride, silicon oxide or the like. The metallic wires 221 and the metallic pads 222 may be arranged diversely and constructed in view of their positions and structures.

Figure 9:
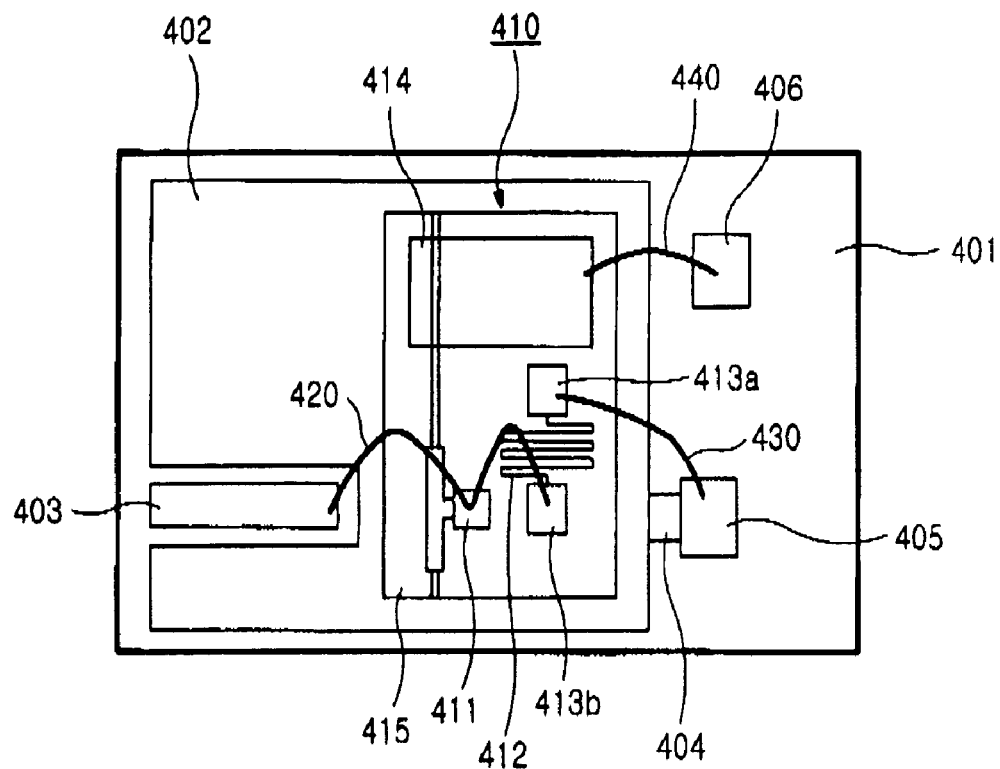
FIG. 9 is a plan view showing a configuration of a semiconductor optical package in accordance with another aspect of the present invention.

FIG. 9 is a plan view showing a configuration of a semiconductor optical package in accordance with a second aspect of the present invention. The semiconductor optical package in accordance with this aspect of the present invention includes a semiconductor optical device 410, a submount 401, a common electrode 402, a signal line 403, a resistor part 404, a first wire 420, a second wire 430, a driving circuit 406 and a third wire 440.

The semiconductor optical device 410 also includes a semiconductor substrate 415, an electro-absorption modulator (not shown) and at least one optical device (not shown) monolithically integrated on the semiconductor substrate 415, a first upper electrode 411 for applying a driving voltage to the electro-absorption modulator, a second upper electrode 414 for applying a driving electric current to the optical devices, and metallic wires 412 and metallic pads 413a, 413b for providing constant inductance.

Figure 10:
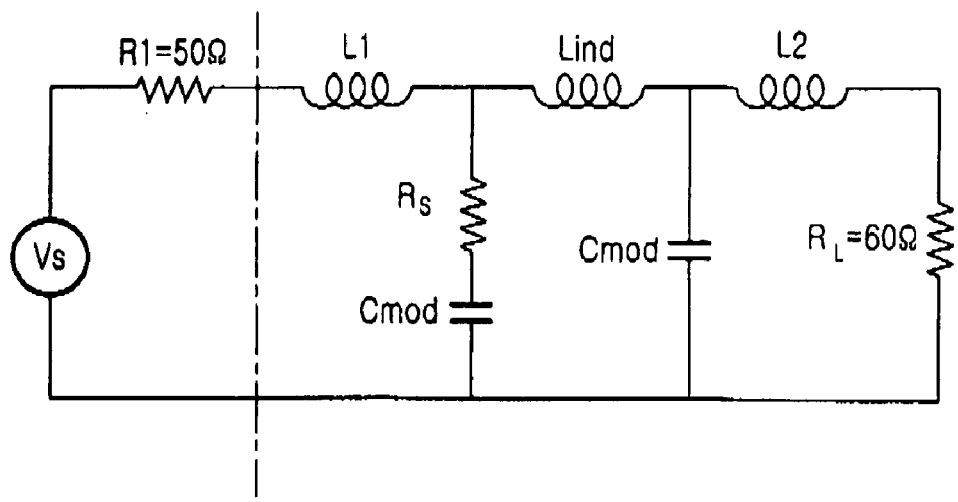
FIG. 10 is a view of an equivalent circuit for explaining inductance of a second wire connected by wire bonding to an electro-absorption modulator of a semiconductor optical device constituting the semiconductor optical package in FIG. 9.

FIG. 10 shows an equivalent circuit illustrating the effects of inductance of the second wire 430 connected to the electro-absorption modulator of the semiconductor optical device 410 in FIG. 9 by wire bonding. Referring to FIG. 10, "$L_1$" and "$L_2$" shown in the equivalent circuit of the semiconductor optical package in accordance with the second aspect of the present invention correspond to the first wire 420 and the second wire 430, respectively. "Lind" and "Cind" designate inductance and capacitance generated by the metallic wires 412 and the metallic pads 413a, 413b formed on the semiconductor optical device 410, respectively, and "Cmod" and "Rs" designate values of capacitance and series resistance of the electro-absorption modulator, respectively. Also, "$R_L$" designates resistance of the resistor part, and "Vs" and "$R_1$" represent a configuration of an electrical signal generator (not shown in FIG. 9). In this aspect of the invention, "$R_L$" has a value of 60° (±5 Ω). The electrical signal generator applies an electrical signal to the electro-absorption modulator outside the semiconductor optical device.

Figure 1:
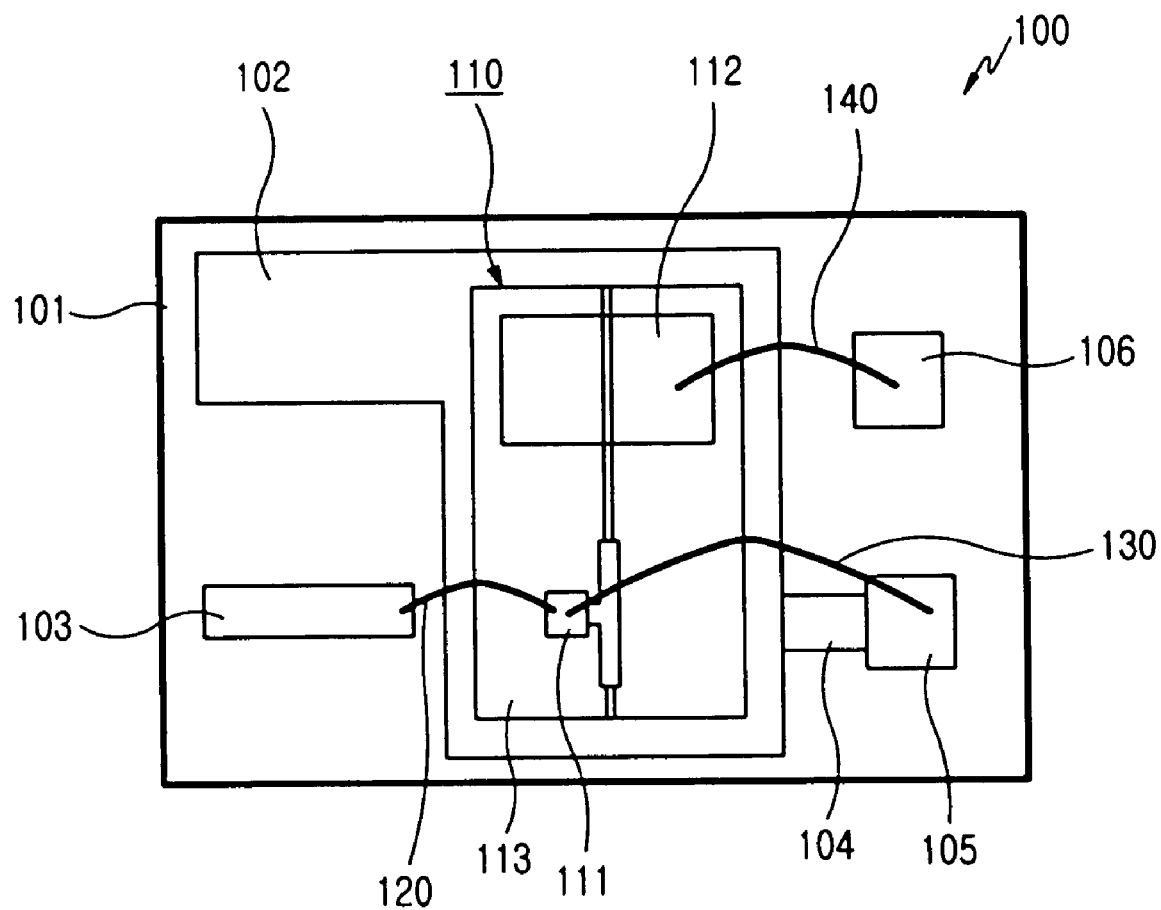
FIG. 1 is a plane view showing a configuration of a conventional semiconductor optical package.
Figure 2:
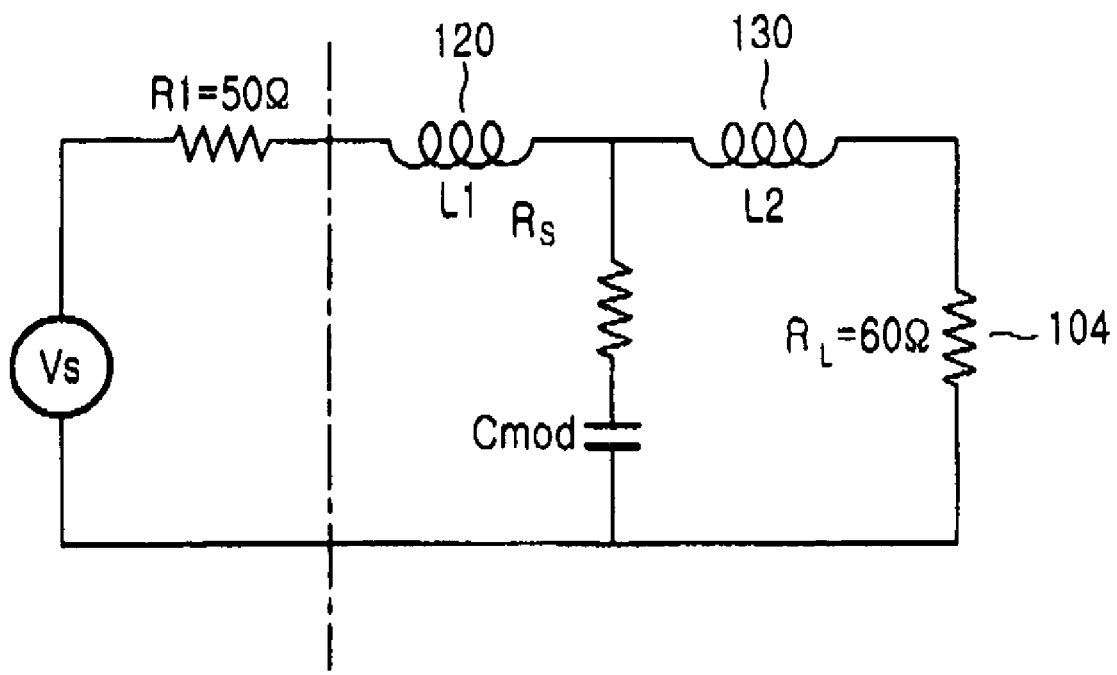
FIG. 2 is a view of an equivalent circuit for explaining inductance of a second wire connected by wire bonding to an electro-absorption modulator of a semiconductor optical device constituting the semiconductor optical package in FIG. 1.
Figure 3:
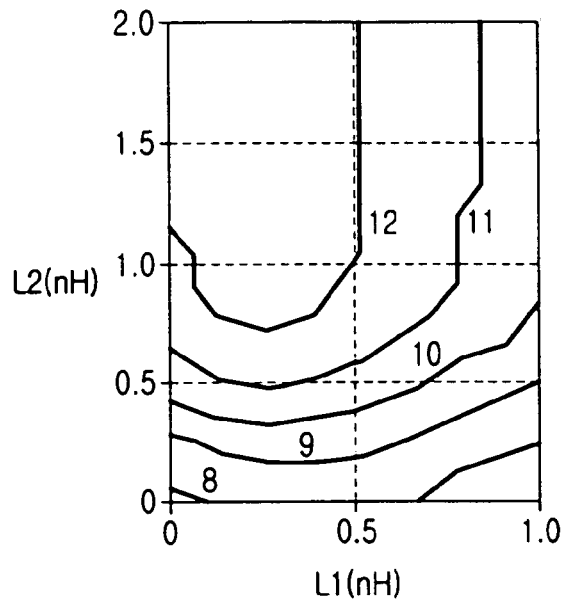
FIGS. 3 to 6 are graphs showing bandwidth changes of light output according to inductance changes of the equivalent circuit shown in FIG. 2.
Figure 4:
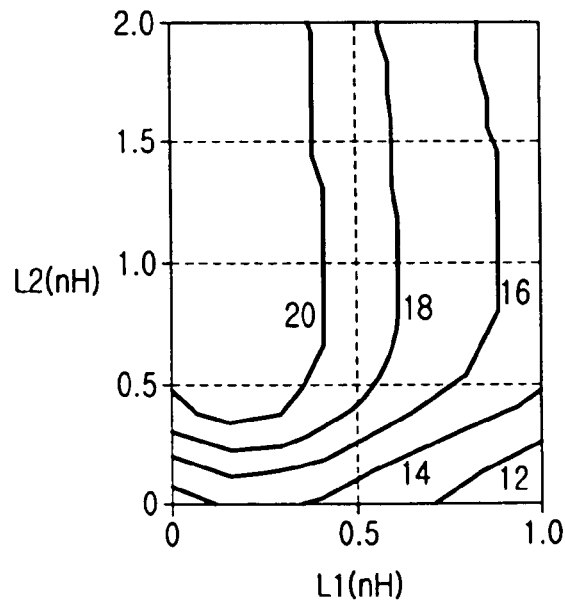
Figure 5:
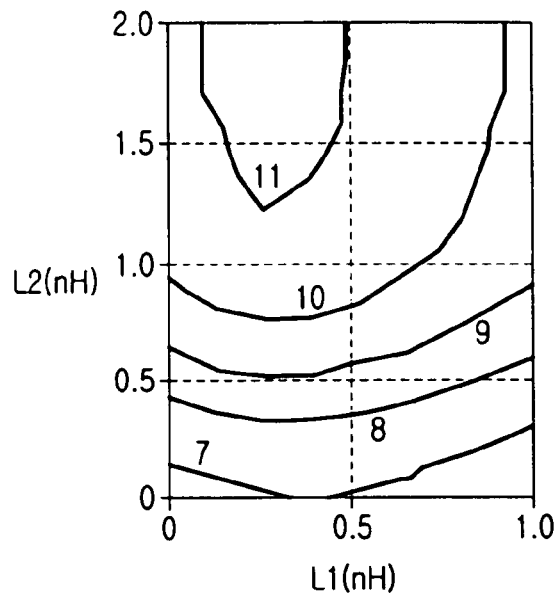
Figure 6:
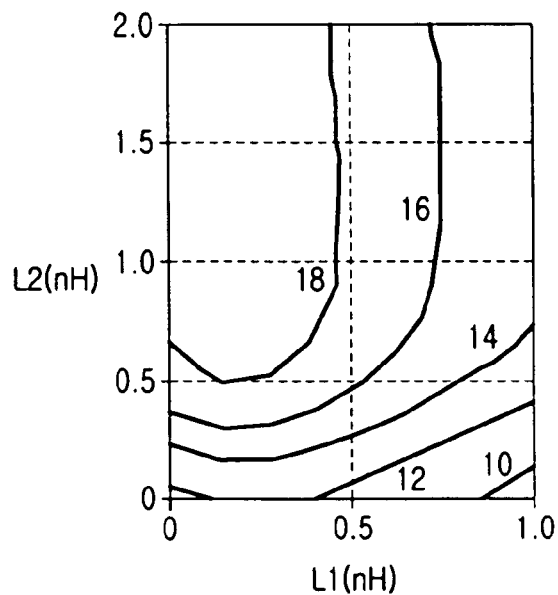
Figure 11:
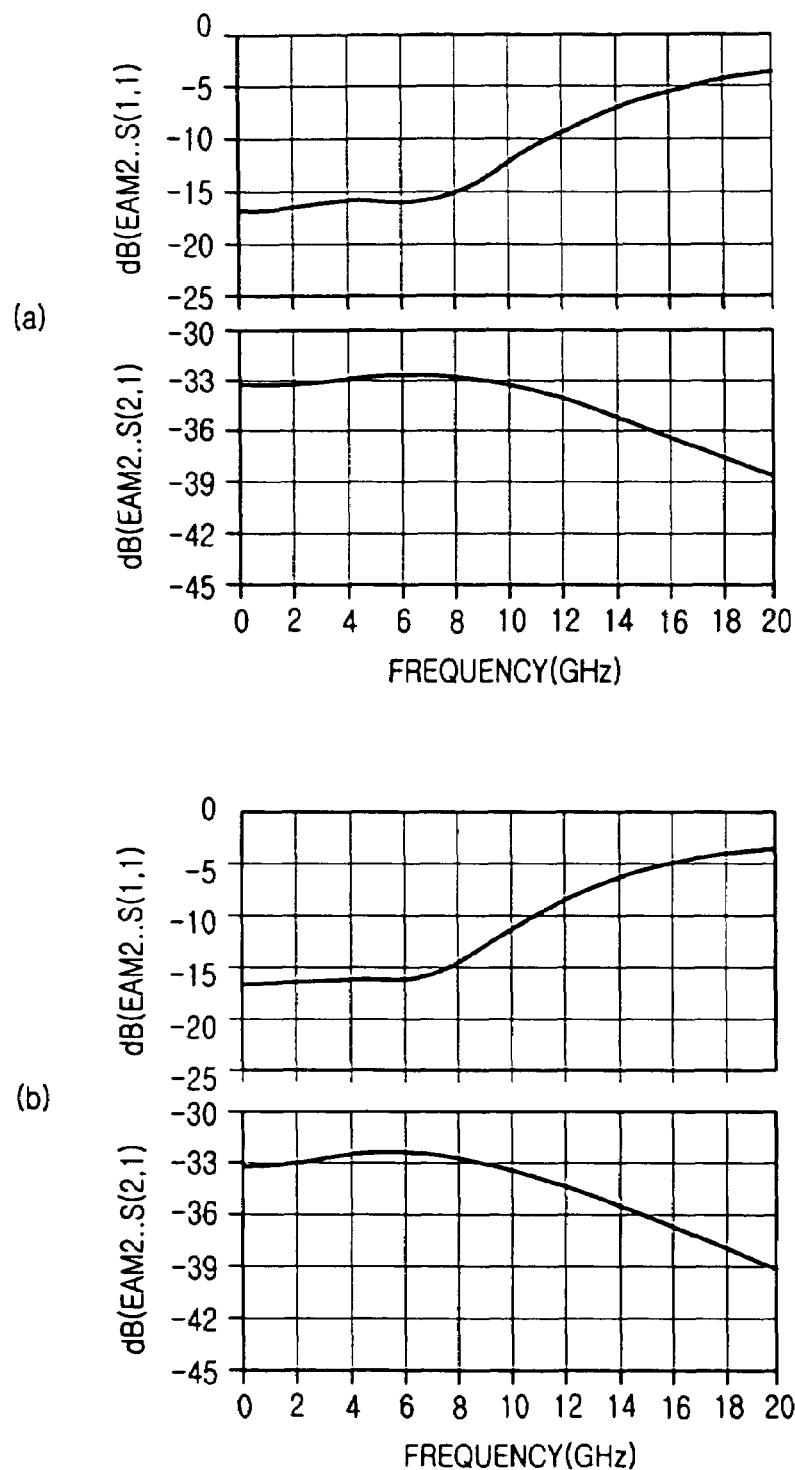
FIGS. 11a and 11b are graphs illustrating return loss characteristics of $S_{11}$ and $S_{21}$ of the equivalent circuit in FIG. 10 as compared with those of the equivalent circuit in FIG. 2.

FIG. 11 shows graphs illustrating the return loss characteristics of $S_{1,1}$ and $S_{2,1}$ of the equivalent circuit in FIG. 10 as compared with those of the equivalent circuit shown in FIG. 2 of the prior art.

FIG. 11a illustrates $S_{1,1}$ (return losses) and $S_{2,1}$ (bandwidth characteristic) in a case of applying a wire where $L_2$=1.5 nH to the equivalent circuit in FIG. 2. On the other hand, FIG. 11b illustrates $S_{1,1}$ and $S_{2,1}$ in a case of applying a wire of Lind=1.3 nH, Cind=0.1 pf and $L_2$=0.5 nH to the equivalent circuit in FIG. 10.

Considering results presented in the graphs, it can be seen that when comparing the bandwidth characteristic of the conventional semiconductor optical package to that of the present invention, the conventional semiconductor optical package becomes more and more inferior as the values of capacitance and resistance of the electro-absorption modulator become larger. In addition a constant bandwidth characteristic of 10 G or more can always be obtained by setting the length of $L_2$ to be relatively longer in comparison with that of $L_1$. If $L_2$ is excessively lengthened, however, an eye pattern of an optical signal may be distorted due to intense peaking, even if the electro-absorption modulator can generate a wide-bandwidth optical signal.

However, in the semiconductor optical package of the present invention, on the contrary, stable optical transmission characteristics of $S_{1,1}$ and $S_{2,1}$ can be obtained while length of $L_2$ shorter than that of the conventional semiconductor optical package is set.

In the present invention the metallic pads and the metallic wires are adapted for functioning as an inductor having inductance more than a certain value, and are formed on the semiconductor optical device so as to adjust inductance of the electro-absorption modulator, and thus enables the second wire 430 to be shortened in actual construction of the semiconductor optical package. Moreover, the present invention provides optimized inductance according to capacitance and resistance of the electro-absorption modulator by disposing of the plurality of metallic pads 413a, 413b at a distance from each other between the metallic wires 412.

The metallic wires 412 and the metallic pads 413a, 413b are formed on the insulative layer (not shown in FIG. 9), and parasitic capacitance of the metallic wires 412 and the metallic pads 413a, 413b can be minimized to 0.1 pf or less by forming the dielectric layer (not shown in FIG. 9) doped with BCB, silicon nitride, silicon oxide or the like on the insulative layer, which is formed with the metallic wires and the metallic pads 412, 413a, 413b.

While the conventional semiconductor optical device always has a transmission speed of 10 G and a constant bandwidth characteristic when $L_1$ is 0.5 nH and $L_2$ is 1 to 3 nH, the semiconductor optical device in accordance with the present invention can provide modulated light having a transmission speed of 10 G and stable frequency and eye pattern characteristics even when $L_2$ is 1 nH or less. The semiconductor optical device 410, the resistor part 404, the driving circuit 406, the signal line 403 and so forth are securely mounted on an upper surface of the submount 401, and the common electrode 402 is formed between the semiconductor optical device 410 and the submount 401. The common electrode 402 provides a ground to the semiconductor optical device 410.

The signal line 403 for applying an electrical signal to the electro-absorption modulator is arranged in a portion not forming the common electrode 402 on the submount 401 and is electrically connected to the first upper electrode 411 by the first wire 420.

The resistor part 404 is electrically connected to the common electrode 402 on the submount 401, and an upper electrode 405 of the resistor part 404 is electrically connected to the metallic pads 413a, 413b by the second wire 430. In other words, the resistor part 404 electrically connects the first upper electrode 411 of the electro-absorption modulator to the common electrode 402 to match a value of impedance between the signal line 403 and the electro-absorption modulator.

Therefore, the second wire 430 either connects the upper electrode 405 of the resistor part 404 to a metallic pad from among the metallic pads 413a, 413b, which is located in a specific position, or the second wire directly connects the upper electrode 405 of the resistor part 404 to the first upper electrode 411 according to changes in capacitance and resistance characteristics of the electro-absorption modulator. Also, inductance can be adjusted according to connecting positions during wire bonding by elongating the upper electrode 405, and can be adjusted by connecting the first upper electrode 411 to a metallic pad in a specific position from among the metallic pads 413a, 413b.

The driving circuit 406 for applying a driving electric current is formed on the submount 401 and is electrically connected to the second upper electrode 414 by the third wire 440.

As described above, the semiconductor optical device in accordance with the present invention has an advantage in that it creates an optical device of a mesa structure and simultaneously forms pluralities of metallic pads and metallic wires connected to the optical device on an insulator, thereby enabling inductance to be selectively established so as to provide an optimal transmission characteristic when the semiconductor optimal device is connected to other optical devices, a driving circuit or the like. Also, since length of the second wire is shortened as compared with that of a conventional semiconductor optical device, the semiconductor device of the present invention can be applied to a semiconductor optical package that is more miniaturized than that of the prior art.

While the invention has been shown and described with reference to certain preferred aspects thereof, it will be understood by those skilled in the art that various changes in form and details may be made therein without departing from the spirit and scope of the invention as defined by the appended claims.

What is claimed is:

1. A semiconductor optical device comprising:
a semiconductor substrate;
an electro-absorption modulator and at least one optical device being monolithically integrated and arranged on the semiconductor substrate;
an insulative layer surrounding the electro-absorption modulator and the at least one optical device arranged on the semiconductor substrate;
at least two metallic pads, one of which being an electrode of the modulator, that are formed at a distance from each other on the insulative layer;
a plurality of metallic wires electrically connecting the electro-absorption modulator to the metallic pads and adapted for adjusting an amount of inductance of the electro-absorption modulator, the metallic wires being formed on the insulative layer; and
a dielectric layer adapted for minimizing parasitic capacitance generated in the at least two metallic pads and the plurality of metallic wires, said dielectric layer being formed under an upper portion of the insulative layer in which the at least two metallic pads and the metallic wires are arranged.

2. A semiconductor optical device comprising:
a semiconductor substrate;
an electro-absorption modulator and at least one optical device being monolithically integrated and arranged on the semiconductor substrate;
an insulative layer surrounding the electro-absorption modulator and the at least one optical device arranged on the semiconductor substrate;
at least two metallic pads, one of which being an electrode of the modulator, that are formed at a distance from each other on the insulative layer;
a plurality of metallic wires electrically connecting, the electro-absorption modulator to the metallic pads and adapted for adjusting an amount of inductance of the electro-absorption modulator, the metallic wires being formed on the insulative layer; and
a dielectric layer adapted for minimizing parasitic capacitance generated in the at least two metallic pads and the plurality of metallic wires, said dielectric layer being formed under the insulative layer having the at least two metallic pads and the metallic wires arranged on the insulative layer,
wherein the dielectric layer contains benzocyclobutene (BCB) for maintaining a total capacitance of the metallic pads except for the modulator electrode and the metallic wires to 0.1 pf or less.

3. A semiconductor optical device comprising:
a semiconductor substrate;
an electro-absorption modulator and at least one optical device being monolithically integrated and arranged on the semiconductor substrate;
an insulative layer surrounding the electro-absorption modulator and the at least one optical device arranged on the semiconductor substrate;
at least two metallic pads, one of which being an electrode of the modulator, that are formed at a distance from each other on the insulative layer;
a plurality of metallic wires electrically connecting the electro-absorption modulator to the metallic pads and adapted for adjusting an amount of inductance of the electro-absorption modulator, the metallic wires being formed on the insulative layer; and
a dielectric layer adapted for minimizing parasitic capacitance generated in the at least two metallic pads and the plurality of metallic wires, said dielectric layer being formed under the insulative layer having the at least two metallic pads and the metallic wires arranged on the insulative layer,
wherein the dielectric layer contains silicon nitride for maintaining the total capacitance of the metallic pads except for the modulator electrode and the metallic wires to 0.1pf or less.

4. A semiconductor optical device comprising:
a semiconductor substrate;
an electro-absorption modulator and at least one optical device being monolithically integrated and arranged on the semiconductor substrate;
an insulative lever surrounding the electro-absorption modulator and the at least one optical device arranged on the semiconductor substrate;
at least two metallic pads, one of which being an electrode of the modulator, that are formed at a distance from each other on the insulative layer;
a plurality of metallic wires electrically connecting the electro-absorption modulator to the metallic pads and adapted for adjusting an amount of inductance of the electro-absorption modulator, the metallic wires being formed on the insulative layer; and a dielectric layer adapted for minimizing parasitic capacitance generated in the at least two metallic pads and the plurality of metallic wires, said dielectric layer being formed under the insulative layer having the at least two metallic pads and the metallic wires arranged on the insulative layer, wherein the dielectric layer contains silicon oxide for maintaining a total capacitance of the metallic pads except for the modulator electrode and the metallic wires to 0.1pf or less.

5. A semiconductor optical device comprising:

a semiconductor substrate:

an electro-absorption modulator and at least one optical device being monolithically integrated and arranged on the semiconductor substrate;

an insulative layer surrounding the electro-absorption modulator and the at least one optical device arranged on the semiconductor substrate;

at least two metallic pads, one of which being an electrode of the modulator, that are formed at a distance from each other on the insulative layer;

a plurality of metallic wires electrically connecting the electro-absorption modulator to the metallic pads and adapted for adjusting an amount of inductance of the electro-absorption modulator, the metallic wires being formed on the insulative layer; and a dielectric layer adapted for minimizing parasitic capacitance generated in the at least two metallic pads and the plurality of metallic wires, said dielectric layer being formed under the insulative layer having the at least two metallic pads and the metallic wires arranged on the insulative layer, wherein an inductance of the semiconductor optical device is adjusted by 0.5 to 3 nH by adjusting a quantity of the metallic pads and the metallic wires formed on the insulative layer.

6. A semiconductor optical device comprising:

a semiconductor substrate;

an electro-absorption modulator and at least one optical device being monolithically integrated and arranged on the semiconductor substrate;

an insulative layer surrounding the electro-absorption modulator and the at least one optical device arranged on the semiconductor substrate;

at least two metallic pads, one of which being an electrode of the modulator, that are formed at a distance from each other on the insulative layer;

a plurality of metallic wires electrically connecting the electro-absorption modulator to the metallic pads and adapted for adjusting an amount of inductance of the electro-absorption modulator, the metallic wires being formed on the insulative layer; and a dielectric layer adapted for minimizing parasitic capacitance generated in the at least two metallic pads and the plurality of metallic wires, said dielectric layer being formed under the insulative layer having the at least two metallic pads and the metallic wires arranged on the insulative layer, wherein an inductance of the semiconductor optical device is adjusted by 0.5 to 3 nH by adjusting a size of the metallic pads and the metallic wires formed on the insulative layer.

7. A semiconductor optical package comprising:

a semiconductor substrate;

an electro-absorption modulator and at least one optical device being monolithically integrated on the semiconductor substrate;

a first upper electrode adapted for providing a driving voltage to the electro-absorption modulator;

a second upper electrode for providing a driving electric current to the optical devices;

a semiconductor optical device including two or more metallic pads and a plurality of metallic wires adapted for providing a constant inductance;

a submount for securely mounting the semiconductor optical device;

a common electrode formed between the submount and the semiconductor optical device and adapted for providing a ground to the semiconductor optical device;

a signal line adapted for applying an electrical signal to the electro-absorption modulator, the signal being located in a portion not forming the common electrode on the submount;

a resistor part adapted for matching a value of impedance between the signal line and the electro-absorption modulator by being connected to the common electrode on the submount;

a first wire adapted for connecting the first upper electrode to the signal line; and a second wire adapted for adjusting impedance applied to the electro-absorption modulator by connecting the metallic pads to the resistor part.

8. The semiconductor optical package as claimed in claim 7, wherein the first upper electrode, the resistor part, and the metallic pads are all connected to each other by selective wire bonding of the metallic wires.

9. The semiconductor optical device as claimed in claim 7, wherein inductance is adjusted by positioning of the metallic pads to be connected during wire bonding by lengthening an upper electrode of the resistor part.

* * * * *